(No Model.)
D. C. BENJAMIN.
NUT LOCK.
No. 588,314. Patented Aug. 17, 1897.
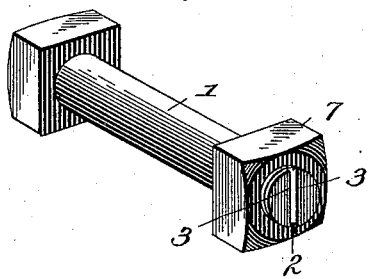
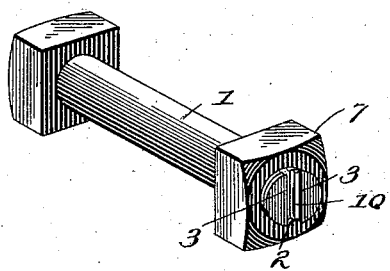
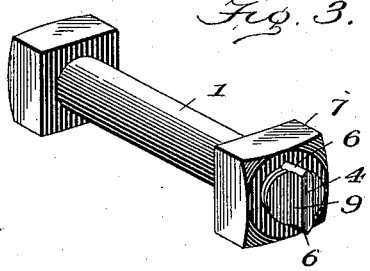
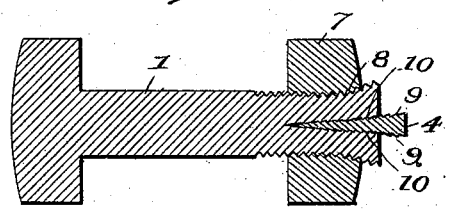
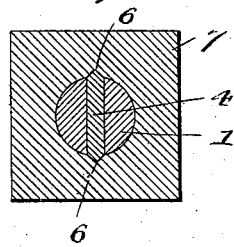
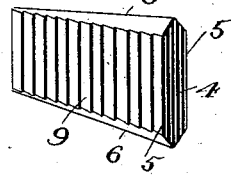
WITNESSES:
Edwin L. Bradford
INVENTOR
Darius C. Benjamin
BY
Lacey,
ATTORNEYS.

UNITED STATES PATENT OFFICE.

DARIUS C. BENJAMIN, OF JACKSON, MINNESOTA, ASSIGNOR OF ONE-HALF TO JOSEPH E. BENJAMIN, OF HUBBEL, NEBRASKA.

NUT-LOCK.

SPECIFICATION forming part of Letters Patent No. 588,314, dated August 17, 1897.

Application filed February 13, 1897. Serial No. 623,289. (No model.)

*To all whom it may concern:*

Be it known that I, DARIUS C. BENJAMIN, a citizen of the United States, residing at Jackson, in the county of Jackson and State of Minnesota, have invented certain new and useful Improvements in Nut-Locks; and I do hereby declare the following to be a full, clear, and exact description of the invention, such as will enable others skilled in the art to which it appertains to make and use the same.

My invention has relation to improvements in nut-locks; and the object is to provide a simple and convenient device for this purpose; and to this end the novelty consists in the construction, combination, and arrangement of the same, as will be hereinafter more fully described, and particularly pointed out in the claim.

In the accompanying drawings the same figures of reference indicate the same parts of the invention.

Figure 1 is a perspective view of a nut-lock embodying my invention. Fig. 2 is a similar view showing the nut temporarily locked on the bolt. Fig. 3 is a view showing the manner of locking the nut permanently on the bolt. Fig. 4 is a longitudinal section of the threaded end of the bolt and nut. Fig. 5 is a cross-section of the same, and Fig. 6 represents an enlarged perspective view of the locking-wedge.

1 represents an ordinary bolt, in the threaded end of which is formed the longitudinal slot 2, the contiguous walls 3 3 of which are provided with transverse serrations and are approximately parallel and extend a suitable distance to correspond with the thickness of the nut.

7 represents the nut, which is internally threaded, and the outer edge 8 diverges outwardly and is also threaded to receive the contiguous threaded portion of the split end of the bolt.

The nut 7 is locked on the bolt by spreading the walls of the slot apart, which may be conveniently done, as shown in Fig. 2, by means of a cold-chisel or any other suitable implement.

It will be readily seen that when it is desired to remove the nut the same can be accomplished in the usual manner, as in turning it off the walls of the slot will be forced parallel with each other, as they were before the nut was locked.

In Fig. 6 is shown a hardened-steel wedge 4, the converging walls 5 5 of which are roughened or serrated and the edges 6 6 beveled in such manner as to form a cutting-angle the entire length of the wedge.

It will be seen that the serrations or teeth 9 on the converging walls of the wedge are ratchet-shaped, the points of the serrations or teeth inclining toward the butt-end of the wedge to facilitate the retention thereof in the slot in the end of the bolt. The beveled edges 6 6 also converge from the butt to the point of the wedge to facilitate its entry, and when driven home these beveled edges cut into the threads in the nut and prevent the possibility of its turning in the slightest degree.

As various modifications of my invention will readily suggest themselves to those skilled in the art to which it appertains without departing from the spirit thereof, I do not wish to be confined to the precise construction herein shown.

Having thus fully described my invention, what I claim as new and useful, and desire to secure by Letters Patent of the United States, is—

A nut-lock comprising the nut 7, in combination with the bolt 1 provided with the slot 2, and the wedge 4 having its edges 6 6 converging longitudinally from the butt to the point, substantially as shown and described.

In testimony whereof I affix my signature in presence of two witnesses.

DARIUS C. BENJAMIN.

Witnesses:
H. L. STROM,
JOHN K. BROWN.